Nov. 23, 1948.   E. M. GILES   2,454,443
GRIP NUT
Filed Oct. 11, 1943
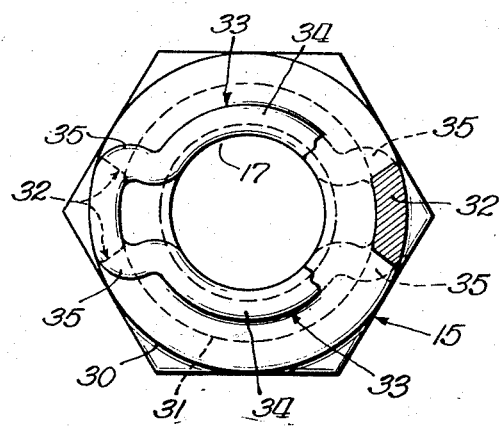
INVENTOR.
Eugene M. Giles Patented Nov. 23, 1948

2,454,443

UNITED STATES PATENT OFFICE 2,454,443

GRIP NUT

Eugene M. Giles, Western Springs, Ill., assignor, by mesne assignments, to Illinois Tool Works, Chicago, Ill., a corporation of Illinois Application October 11, 1943, Serial No. 505,830

6 Claims. (Cl. 10—86)

My invention relates to nuts, or other internally threaded parts, which are adapted to have threaded engagement with an externally threaded part, such as a bolt, and has reference more particularly to gripping facilities whereby the nut or internally threaded part has a frictional gripping engagement with the threads of the bolt or externally threaded part to hold these threaded parts against accidental displacement in any position of adjustment.

As pointed out in my previous application, Serial No. 501,623 for Stop nut which was filed September 9, 1943, and now Patent 2,386,307 issued October 9, 1945, grip nuts of this character, which are commonly referred to as stop nuts, require a highly tenacious frictional engagement which is unaffected by oil, water, heat or other conditions to which such nuts are likely to be exposed in use. It is at the same time important that the parts do not become frozen together or otherwise interlocked in any manner that will interfere with ready disengagement thereof from one another whenever required. It is also desirable that the disengagement shall not impair either of the parts for reuse and that the parts may be capable of being reused repeatedly with the same immunity to accidental displacement.

As further pointed out in my aforesaid application Serial No. 501,623, nuts of this character must be made approximately the same size as the corresponding ordinary nut and capable of safely sustaining the same load and there is accordingly only a very limited space within which these gripping facilities may be accommodated. On account of this limitation of space, the tenacity of frictional engagement and other characteristics which are essential and desired, the making of a satisfactory grip nut or stop nut is a peculiarly and extraordinarily difficult problem.

Moreover, while nuts of this character are highly desirable for general use, the cost thereof has been a prohibitive factor in many cases and it is accordingly important to minimize cost. It is preferable also that the entire nut, including the gripping facilities, be of the same material and of one piece construction.

The principal objects of my invention are to provide a stop nut of simple form with ample gripping tension to hold the nut securely in place on a threaded stem; to permit construction of the gripping facilities as an integral part of the nut; to afford substantially any degree of gripping tension that may be desired; and to provide a stop nut which may be produced rapidly and requires a minimum of material and equipment; these and other objects being accomplished as pointed out hereinafter and as shown in the accompanying drawing in which: The figure is a top view of a stop nut constructed in accordance with my invention.

On the drawing the reference numeral 15 indicates the nut body proper which has a threaded opening 17 therethrough to receive a threaded stem, such for example as the threaded end of a bolt, and 34, 34 are opposed arcuate gripping facilities, likewise internally threaded, and providing a threaded opening smaller than that of the opening 17 of the nut body so as to bear with a gripping tension against a threaded stem screwed through the opening 17 of the nut body 15.

These gripping facilities 34, 34 are portions of a deformed ring 33 which is secured to the nut body 15 at diametrically opposite places 32 near the outer margin of the nut body and severed therefrom between these diametrical places 32 of attachment to the nut body and these loose severed portions are deformed, as shown in the drawing, to form the opposed arcuate gripping portions 34, 34 with outturned portions 35 at their ends, which said portions 35, together with the portions of the ring 33 at the attached places 32, provide loops at opposite sides of the openings 17 which permit the arcuate portions 34, 34 to yieldingly separate to accommodate and tightly grip a threaded stem screwed through the opening 17 and between these arcuate portions 34, 34.

In effect, the gripping facilities are composed of a ring split at diametrically opposite places and with the split ends joined by outwardly extending spring loops or folds which are integral with the split parts of the ring, the bight portions of these spring loops or folds being secured to the nut body near its outer margin.

In making this nut, the nut body 15 may be made initially, with a ring at the outer margin 30 of the top of the nut body and of a thickness substantially as indicated between the line 30 and the dotted line 31 so that this ring is spaced outwardly from the nut opening 17. This ring may then be severed from the nut body at diametrically opposite sides, as for example by a thin circular saw, leaving it connected with the nut body only at the diametrically opposed places 32, whereupon by placing a suitable form within the thus slitted ring the slitted sides thereof may be stamped into the shape shown at 33 with arcuate portions 34 at opposite sides of the opening 17 connected at their ends by arms 35 to the places of attachment 32. These arcuate portions 34 are closed together so that the space therebetween is less than the diameter of the opening 17 and then while spread and held apart slightly with inserts between each pair of arms 35 and while confined against greater separation the arcuate portions 34 are internally threaded with the same tap by which the nut body 15 is threaded thereby affording exact continuity of threading through the nut body 15 and the arcuate sections 34.

Upon completion of the threading and removal of the inserts by which the arms 35 were maintained in slightly separated relation during the threading, the arcuate sections 34 spring back to the normal position in which the distance therebetween is less than the diameter of the opening 17 and when a threaded stem is screwed through this nut the internally threaded arcuate sections 34 are forced outwardly and resiliently grip the threaded stem to frictionally resist turning movement of the nut on the threaded stem.

From the foregoing it will be understood that I have provided a grip nut wherein the gripping facilities and the nut body are of the same material and of one piece construction, and that the nut may be provided with substantially any degree of gripping tension that may be desired. Also it will be understood that the amount of gripping tension may be varied not only by the particular design, the flexibility of the stock, and the amount of initial displacement or deformation of the gripping facilities, but that the gripping facilities may be reformed at any time, even on the job, to afford increased tension.

By reason of the gripping facilities being of the same material as the nut body and capable of sustaining appreciable load, the nut body 15 may be made shorter and with less thread length than otherwise. The nut may be made easily and rapidly with comparatively simple and inexpensive equipment and uses a minimum amount of material.

While I have shown and described my invention in preferred form, I am aware that various changes and modifications may be made, as for example the gripping ring could be made separately and welded or otherwise secured to the nut body, without departing from the spirit of the invention, the scope of which is to be determined by the appended claims.

What is claimed is:

1. A nut or the like of the class described comprising a nut body having a non-expansible threaded opening therethrough and a ring member thereon at one end of said opening with an expansible threaded opening therethrough smaller than the threaded opening of the nut body, said ring member comprising opposed separable arcuate portions having adjoining ends thereof connected at one end of the opening by an outwardly extending U-shaped fold and said ring member being connected to the nut body at the outer extremity of the fold and at the sides of the fold and along the arcuate portions loose from the nut body.

2. A nut or the like of the class described comprising a nut body having a non-expansible threaded opening therethrough and a ring member thereon at one end of said opening with an expansible threaded opening therethrough smaller than the threaded opening of the nut body, said ring member comprising opposed separable arcuate portions having at opposite sides of the opening adjoining ends connected by an outwardly extending U-shaped fold and said ring member being connected to the nut body at the outer extremity of each said fold and therebetween loose from the nut body.

3. The method of making a nut of the class described which said method comprises forming a nut body with an opening therethrough and with a ring-like extension at one end having an opening therethrough substantially larger than that of the nut body, then severing opposed arcuate portions of the ring-like extension from the nut body in a manner to leave the ring-like extension attached to the nut body at diametrically opposed places, then deforming the severed opposed arcuate portions and thereby forming smaller opposed arcuate portions which conform substantially to the nut opening and forming at at least one of the aforesaid diametrically opposed places a U-shaped fold resiliently connecting adjoining ends of said smaller arcuate portions and then correspondingly internally threading the nut opening and said smaller arcuate portions, said smaller arcuate portions, after threading thereof, being contracted closer together.

4. A lock nut including a rigid internally threaded body, circumferential spaced lugs integral with and extending axially from the body at one extremity thereof, said lugs being spaced radially outward from the internally threaded nut aperture, and resilient locking sections formed integral with and extending between said lugs, said locking sections being severed from an axially projecting portion of the body and shifted transversely with respect to the axis of said body to present arcuate thread engaging surfaces of limited circumferential extent normally positioned inwardly with respect to the maximum diameter of the internal thread in the body.

5. A lock nut including a rigid internally threaded body, circumferentially spaced lugs integral with and extending axially from the body at one extremity thereof, said lugs being spaced radially outward from the internally threaded nut aperture, segmental circumferentially spaced locking sections superimposing the aforesaid extremity of the body and having arcuate thread engaging surfaces normally positioned inwardly with respect to the maximum diameter of the internal thread in the body, and connecting elements extending between said lugs and locking sections, said locking sections and connecting elements being severed from an axially projecting portion of the body and shifted transversely with respect to the axis of said body.

6. A lock nut including a rigid internally threaded body, a plurality of circumferentially spaced lugs integral with and extending axially from the body in the vicinity of the outer periphery thereof, said lugs being spaced radially outward from the internally threaded nut aperture, a thread locking section extending from one side of one lug to one side of the next adjacent lug in superimposing relation to the body, and another thread locking section extending with the other sides of said lugs and superimposing said body, each of said locking sections including a segmental portion having arcuate thread engaging surfaces of a limited circumferential extent normally positioned inwardly with respect to the maximum diameter of the internal thread in the body, and connecting elements extending radially outwardly from the extremities of said arcuate portion to complementary lugs.

EUGENE M. GILES.

REFERENCES CITED

The following references are of record in the file of this patent:

UNITED STATES PATENTS

| Number | Name | Date |
|---|---|---|
| 888,948 | Bryar | Dec. 18, 1906 |
| 1,113,419 | Dollman | Oct. 13, 1914 |
| 2,007,293 | Cayouette | July 9, 1935 |
| 2,279,388 | Cox | Apr. 14, 1942 |

FOREIGN PATENTS

| Number | Country | Date |
|---|---|---|
| 327,289 | Great Britain | Apr. 3, 1930 |
| 725,076 | France | Feb. 6, 1930 |